Dec. 16, 1930.  A. R. THOMPSON  1,785,018
FRUIT PITTING APPARATUS
Original Filed Oct. 30, 1926   3 Sheets-Sheet 1
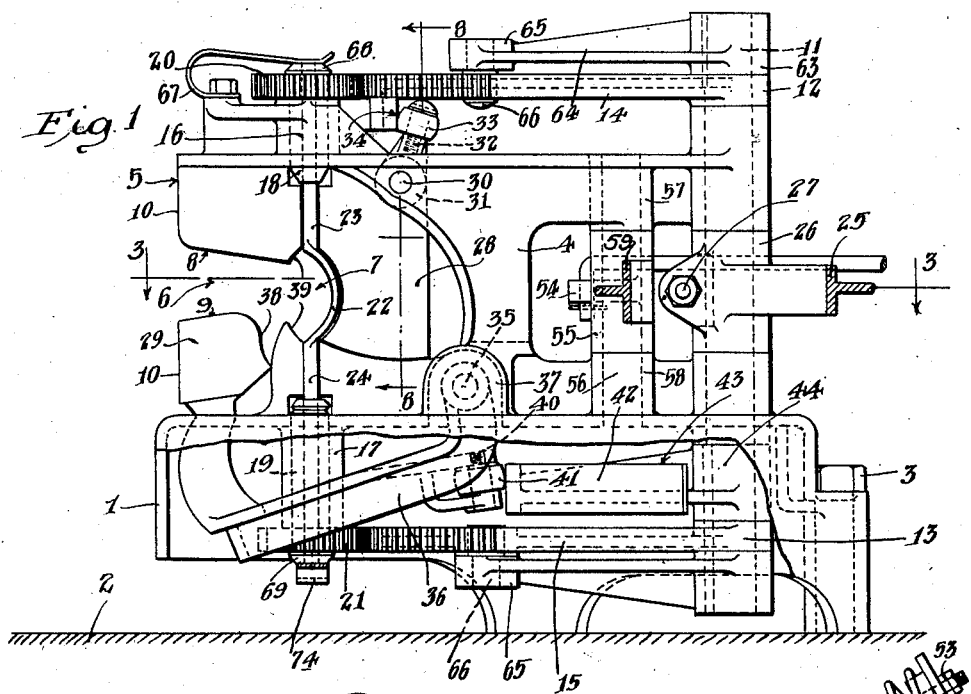
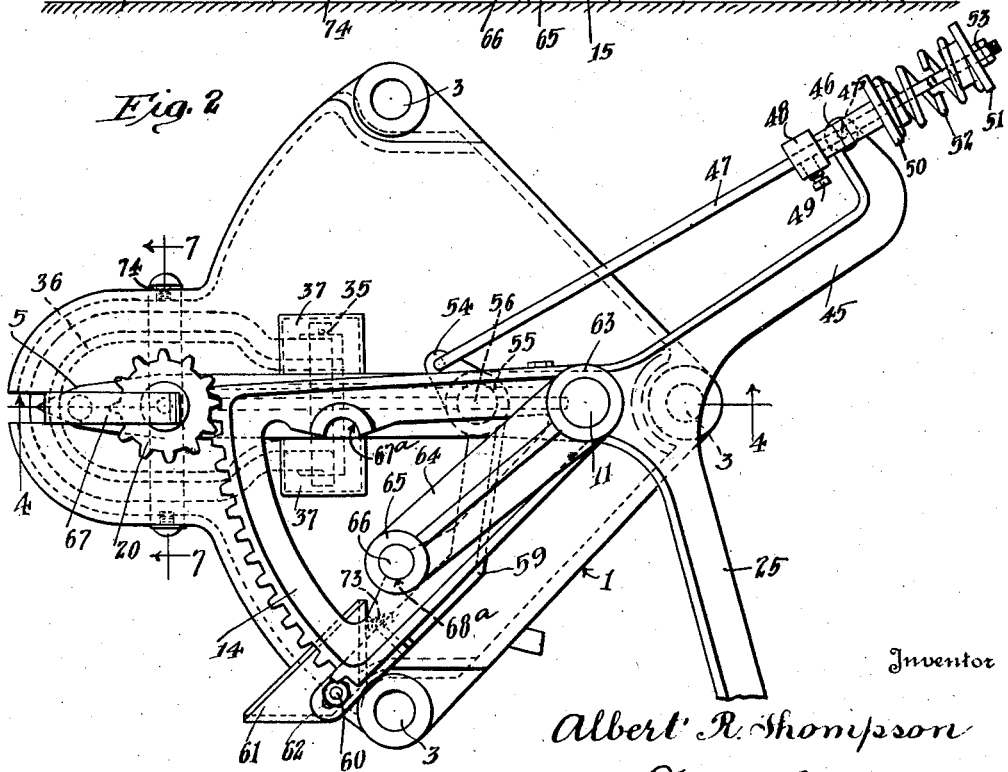
Inventor
Albert R. Thompson
By Lyon & Lyon
Attorneys

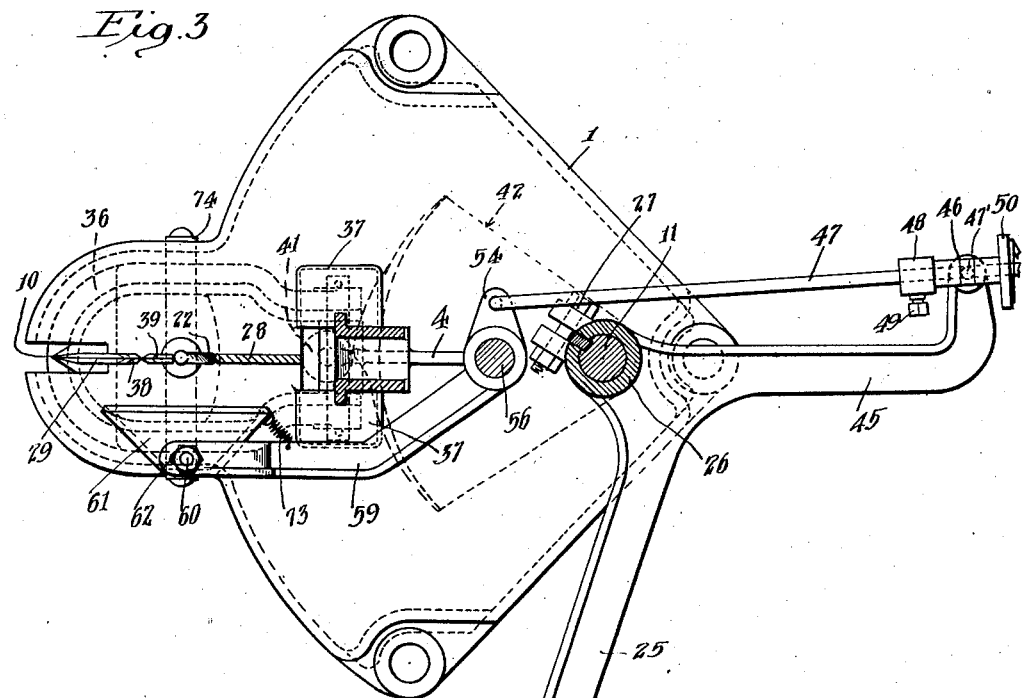
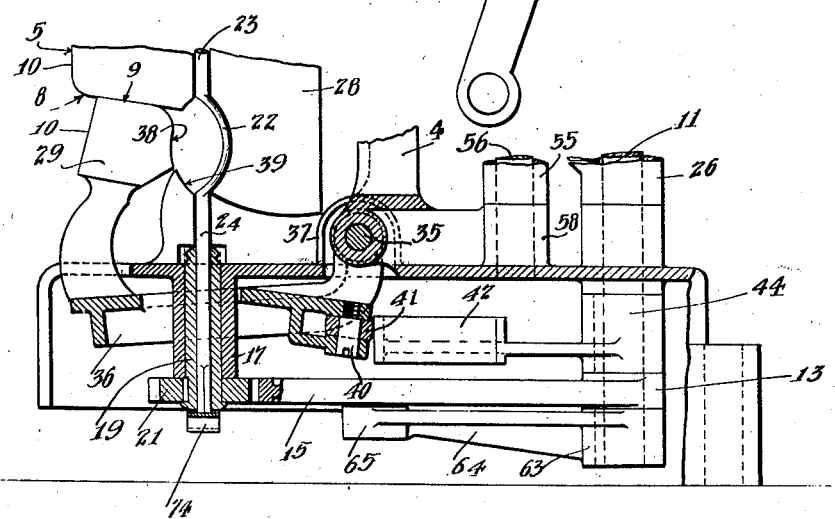

Dec. 16, 1930.  A. R. THOMPSON  1,785,018
FRUIT PITTING APPARATUS
Original Filed Oct. 30, 1926  3 Sheets-Sheet 3
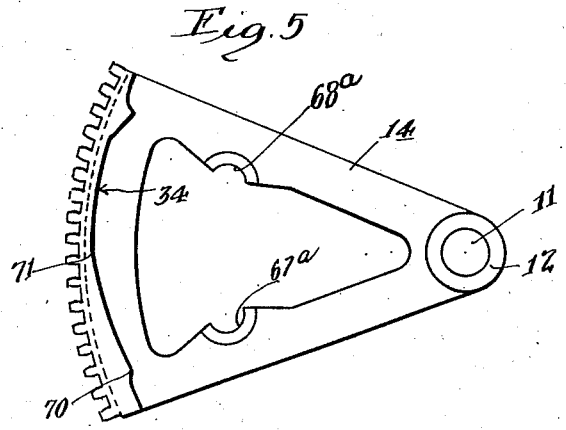
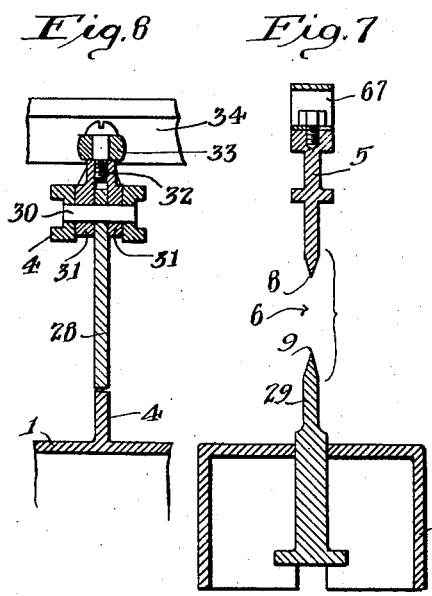
Inventor
Albert R. Thompson
By Lyon & Lyon
Attorneys Patented Dec. 16, 1930

1,785,018

UNITED STATES PATENT OFFICE

ALBERT R. THOMPSON, OF SAN JOSE, CALIFORNIA, ASSIGNOR TO PACIFIC MACHINERY COMPANY, OF SAN FRANCISCO, CALIFORNIA, A CORPORATION OF CALIFORNIA

FRUIT-PITTING APPARATUS

Application filed October 30, 1926, Serial No. 145,160. Renewed May 20, 1930.

This invention relates to fruit pitting apparatus, and is more particularly related to an apparatus for pitting clingstone peaches, in which there is provided means for shifting the pit during the actuation of a rotary pitting means so that the pitting means will pass close to the pit of the fruit without cutting deep into the pulp of the fruit but so that the pitting means will pass over the fins of the pit without cutting the same.

In the pitting of fruit, and particularly clingstone peaches, it is essential that great care be taken to make a clean cut around the pit, close to the pit, without cutting away any portion of the pit; or any portion of the laterally projecting fins which extend outward from the pit. The cut must not be too deep into the pulp of the fruit to remove too great a portion thereof, but the cut must be deep enough to remove all of the "red center" around the pit. The cut must be so as to leave as much depth as possible to the halves of the fruit to avoid the formation of "shells" which break down in cooking and to avoid the formation of "ribbons" when canning sliced fruit.

In fruit, and particularly in clingstone peaches, it is a well known fact that the pits vary in size over a relatively large range and that the ratio of the size of the pit to the size of the fruit is not constant. It is also a known fact that the thickness of a pit, particularly in clingstone peaches, is fairly constant, irrespective of the width of the pit or the size of the fruit.

A pit has three maximum dimensions which are known in the trade as the length, width and thickness, and in this specification, the term "depth", or depth of the cut of the rotary knife, is used to designate the "depth" of the cut formed by the rotary knife in each half of the fruit pulp or flesh around the shortest of these maximum dimensions or the "thickness" of the pit.

In fruit pitting machines or devices, if a knife is used which is of large enough cutting radius to pass over and around all fins and edges of the thickness and width of the pit, there will be formed in the halves of the fruit cuts which are too deep, thereby forming "shells" or "ribbons" depending on the use to which the pitted fruit is put to, and also resulting in a reduction of the ratio, the weight of available fruit for canning to the weight of fruit bought by the cannery or the like.

It is, therefore, an object of this invention to provide a fruit pitting apparatus comprising means for halving the flesh of the fruit, a rotary pitting knife, and means for shifting or reciprocating the fruit pit so as to permit the said knife to pass around the pit close thereto, and to pass over the fins of the pit irrespective of the size of the pit.

Another object of this invention is to provide a fruit pitting apparatus comprising means for cutting a fruit annularly to gain access to the pit, a curved pitting knife, and which curved pitting knife has a cutting radius to form a cut in the halves of the fruit of a desired depth irrespective of the width of the pit, and means to shift the pit so as to allow the said knife to pass freely around the pit.

Another object of this invention is to provide a fruit pitting apparatus including a curved pitting knife having a cutting radius adapted to cut to the depth of the pit but less than the width of the pit, and means adapted to reciprocate the pit of the fruit to allow the knife to pass around the edges or fins of the pit.

Another object of this invention is to provide a fruit pitting apparatus including a curved rotary pitting knife having a cutting range slightly in excess of the thickness of the pit so as to clear the pit at this maximum thickness and form a cut to remove the "red center" and means adapted to enter the cut of the fruit and shift or reciprocate the pit in the plane of the cut so as to move the pit to positions which will allow the knife to pass around and clear the said pit and edges and fins thereof a sufficient distance to insure the formation of a "clean cut" and the removal of all "red center" surrounding the pit.

Another object of this invention is to provide a fruit pitting device having a curved pitting knife and means adapted to contact the pit and shift or reciprocate the pit during the operation of the pitting knife so as to permit or allow the pitting knife to cut a given distance from the edges or fins of the pit irrespective of the width of the pit.

Another object of this invention is to provide a fruit pitting machine including a curved rotary pitting knife and means for alternately contacting the pit from the opposite side to slide the said pit and fins thereof within the cutting radius of the said pitting knife.

Other objects and advantages of my invention will be apparent from the following detailed description of a preferred embodiment thereof as illustrated in the accompanying drawings, in which drawings:

Figure 1 is a side elevation partly broken away of a fruit pitting apparatus embodying this invention.

Figure 2 is a top plan view thereof.

Figure 3 is a sectional top plan view taken substantially on the line 3—3 of Figure 1.

Figure 4 is a fragmental sectional side elevation taken partially on the line 4—4 of Figure 2.

Figure 5 is an inverted plan view of one of the gear segments embodied in this invention, illustrating one cam surface.

Figure 6 is an inverted plan view of an arc segment embodied in this invention illustrating the second cam surface.

Figure 7 is a sectional end elevation taken substantially on the line 7—7 of Figure 2.

Figure 8 is a sectional end elevation taken substantially on the line 8—8 of Figure 1.

In the preferred embodiment of this invention illustrated in the accompanying drawings, 1 designates a base which may be of any desired form and which is secured to a stand or table 2 by any suitable means, such as the screws 3.

Formed preferably integral with the base 1 is a web 4, which web 4 is formed to provide an impaling blade 5 upon which the flesh of the fruit is cut annularly to the depth of the pit. The impaling blade 5 is slotted as at 6 and the slot 6 terminates in a pit receiving recess 7. The edges of the impaling blade are sharpened to provide cutting edges 8, 9 and 10 for severing the flesh of the fruit.

In impaling the fruit on the impaling blade 5, the fruit is gripped in the hand and is pushed over the impaling blade so that the fruit flesh is cut to form halves in the central plane of the pit. The fruit is turned during the impaling operation so that the pit will move into the pit receiving recess 7 with its greatest maximum diameter or the length of the pit transverse to the slot 6.

Means are provided in the pit receiving recess 7 for cutting the flesh of the fruit to free the pit from the cut halves, which means are preferably of the following construction:

Formed on the base 1 and web 4 are cylindrical bosses which provide bearings for an operating shaft 11. The shaft 11 passes through collars 12 and 13 formed on the gear segments 14 and 15, respectively. The gear segments 14 and 15 are journaled on the shaft 11. Formed on the web 4 is a cylindrical boss 16. Formed on the base 1 in alinement with the cylindrical boss 16 is a boss 17. Fitted in the bosses 16 and 17 are bushings 18 and 19 respectively. The bushings 18 and 19 are preferably formed integral with pinions 20 and 21 which mesh with the gear segments 14 and 15. A curved pitting knife 22 is formed integral with two laterally extending shafts 23 and 24 which extend through slots formed in the impaling blade 5 and through the bushings 18 and 19, and are secured to the bushings in any suitable or desirable manner to allow the withdrawal of the pitting knife to replace or repair the same. An operating lever 25 is secured to the shaft 11 at a split collar 26. The collar 26 may be keyed to the shaft 11 to permit the correct positioning thereof and locked on the said shaft by a bolt 27.

The curved pitting knife 22 has a cutting diameter slightly in excess of the thickness of a fruit pit but this cutting diameter or diameter of rotation is less than the width of a peach pit so that if the pit and knife remained stationary, the said rotary knife would not pass around the pit but would cut into the same.

In order to avoid this cutting of the fruit pit or the fins which extend laterally outward from the pit without necessitating the increase of cutting diameter of the said knife, means are provided for shifting the pit during the rotation of the pitting knife so as to move the pit to clear the said knife and cause the same to pass into and through the flesh of the fruit a sufficient distance to cut away the "red center" of the fruit around the pit.

For the purpose of shifting the pit free of the said knife, I prefer to form the impaling blade with two opposed moving portions 28 and 29 which enter the cut formed in the flesh of the fruit along the line of this cut and alternately engage the opposite sides of the pit to shift the pit to a position free of the curved cutting knife in advance of the rotation of the said knife. The rotation of the knife and actuation of the engaging portions 28 and 29 of the impaling blade 5 are timed so as to enable the said pit to be shifted as desired. The size of the pit of the fruit will be immaterial to the operation of this shifting means as the larger the particular pit and fin thereof happens to be in any particular case, the further the same will be shifted by the impaling blade portions 28 and 29 to clear the cutting knife. If the pit is small or of a narrow width, the impaling blade portions 28 and 29 may fail to move the same at all or will only shift the pit a slight distance in time with the rotation of the pitting knife.

The impaling blade portion 28 is pivotally supported at a pin 30 which is passed through bosses 31 formed on the web 4. Mounted on a pin 32, which is screwthreaded to an extension of the movable impaling blade portion 28, is a cam roller 33. The cam roller 33 engages and rolls on a cam surface 34 which is formed preferably integral with the gear segment 14.

The impaling blade portion 29 is pivotally supported at a pin 35 which passes through a bore formed in an extension arm 36 of the portion 29 and also through bosses 37 formed in spaced relation on the web 4.

The impaling blade portion 29 is provided with the sharpened edges 9 and 10 as heretofore described and is also moved to complete the pit receiving recess 7 after the pit of the fruit has been positioned therein, the curved edge 38 thereof being moved into position to complete the curved edge 39 of this recess so as to hold the pit from all points during the cutting of the same free from the flesh of the fruit.

Mounted on a pin 40 which is screw-threaded into a yoke extension of the arm 36 is a cam roller 41, which cam roller 41 rides on a cam surface 42 formed on an arc segment 43. The segment 42 is provided with an integral collar 44 through which the shaft 11 extends. The collar 44 is secured to the shaft 11 by any suitable means, such as a key.

Means are provided for gripping and holding the fruit on the impaling blade during the pitting operation which means are preferably constructed as follows:

An arm extension 45 is formed integral with or secured to the collar 26 and supports at its outer end a slide 46. The slide 46 is pivotally supported at the end of the arm 45, as illustrated at 47'. A rod 47 passes through the slide 46 and is provided with a stop collar 48 which may be secured in adjusted position by means of a set screw 49. Interposed between washers 50 and 51 is a compression spring 52 which yieldably urges the rod 47 outward until the stop 48 engages the end of the slide 46. A nut 53 is screw-threaded to the end of the rod 47 and permits adjustment of the spring tension on the spring 52. The opposite end of the rod 47 passes through an ear 54 which may be formed integral with the collar 55. The collar 55 is journalled on a shaft 56 which passes through and is secured in position within bosses 57 and 58 formed on the web 4 and base 1, respectively.

An arm 59 is also formed integral with the collar 55 and pivotally supported at the end of the arm 59 on a pin 60 is a fruit engaging and holding cup 61. The pin 60 passes through an elongated slot 62 formed in the arm 59 so as to permit the cup 61 to move in accordance with the shifting of the fruit pit so that the flesh of the fruit may move with the pit. Should the fruit not be permitted to move with the pit, the knife 22 would not operate to form the desired cut around the pit and remove the "red center" and also the moving of the pit without moving the flesh of the fruit would result in damaging the flesh of the fruit.

Means are provided for actuating the pitting knife 22 and the impaling blade portions 28 and 29 in timed relation with the actuation of the cup 61, which means are preferably of the following construction:

Secured to the shaft 11 at collars 63 are arms 64 which carry at their ends 65 pins or studs 66 which are adapted to engage in curved pockets 67ª and 68ª formed on the opposed webs of the gear segments 14 and 15. The gear segments 14 and 15 are not actuated to rotate the knife 22 until the studs 66 are engaged in the pockets 67ª so that a lost motion connection is provided between the actuation of the cup 61 and the gear segments 14 and 15. The cup 61 is engaged with the fruit to hold the same on the impaling blade before the gear segments are actuated to rotate the knife 22.

The spring 52 yieldably holds the cup 61 in engagement with the fruit and permits the said cup to hold fruit of varient sizes steady on the impaling blade 5. The stop 48 is for the purpose of maintaining tension in the spring 52.

A spring 67 is provided for engaging and holding a cap 68 in position to secure the shaft 23 of the knife 22 to the bushing 18. The cap 69 of the shaft 24 is held in the same way by a spring 74 secured to the sides of the base 1.

A spring 73 is connected between the cap 61 and the arm 59 for the purpose of yieldably urging the cap 61 to the proper position to engage and hold the fruit and is yieldable to allow the position of the cap 61 to vary in accordance with the surface contour of the fruit.

The operation of the fruit pitting apparatus embodying this invention is:

The operator first takes the fruit in his hand and impales the same on the impaling blade 5 so that the pit of the fruit passes through the slot 6. The fruit is then rotated to position the pit in the pit receiving recess 7. This rotation of the fruit likewise completes the cutting in half of the flesh of the fruit. The operator then grips the handle 25 and rotates the same to rotate the shaft 11. The rotation of the shaft 11 first brings the cup 61 into engagement with the fruit to hold the same on the impaling blade 5. On continued rotation of the shaft 11, the studs 66 engage within the pockets 67 to rotate the gear segments 14 and 15.

The knife 22 is in the position shown in Figure 1 at the start of the pitting operation. As soon as the gear segment 14 is started to rotate, the cam roller 33 passes into the depression 70 in the cam surface 34 and moves the impaling blade portion 28 forward to shift the pit free of the path of the knife 22 and then moves back to allow the knife 22 to pass freely around the edge and fin of the fruit pit. On starting of the rotation of the gear segments 15, the roller 41 passes upon the cam surface 42 to bring the impaling blade portion 29 into position to complete the curve 39 of the pit receiving recess 7. On continued rotation and after the knife has started to rotate and has passed the back edge of the pit, the cam roller 33 rides up onto the raised portion 71 of the cam surface 34 and the cam roller 41 rides up toward the raised edge of the cam surface 42 so that the impaling blade portions are moved in a direction opposed to that of the travel of the knife 22. The impaling blade portion 28 moves away from the pit as the portion 29 engages the pit and causes the same to follow the movement of the portion 28. This motion continues until the cam roller 41 passes over the peak 72 of the cam surface 42 at which time the fruit pit has been moved clear of the knife 22 and then the cam roller 41, passing off the peak 72, carries the impaling blade portion 29 back away from the pit allowing the knife to pass the edge and fin of the fruit. The cam surfaces are then completed to move the impaling blade portions 28 and 29 back to the starting position.

Having fully described a preferred embodiment of my invention, it is to be understood that I do not wish to be limited to the exact details herein set forth which may obviously be varied without departing from the spirit of my invention as set forth in the appended claims.

I claim:

1. A fruit pitter comprising means for halving the flesh of the fruit, a rotary pitting knife having a cutting radius adapted to produce a predetermined depth of cut in the fruit flesh irrespective of the width of the pit, means for rotating the said knife, and means to shift the pit during the rotation of the said knife to permit the knife to pass around the pit.

2. A fruit pitter comprising means for halving the flesh of the fruit, a rotary pitting knife having a cutting diameter adapted to produce a predetermined depth of cut in the fruit flesh irrespective of the width of the pit, means for rotating the said knife, and means for alternately contacting the pit from opposite sides to shift the pit within the cutting diameter of the pitting knife.

3. A fruit pitter comprising means for halving the flesh of the fruit, a rotary pitting knife having a cutting diameter greater than the thickness of the pit but less than the width of the pit, means for rotating the said knife, and means to shift the pit during the rotation of the said knife to permit the knife to pass around the pit.

4. A fruit pitter comprising means for halving the flesh of the fruit, a rotary pitting knife having a cutting diameter greater than the thickness of the pit but less than the width of the pit of the fruit, means for rotating the said knife, and means to alternately contact the pit from the opposite sides to shift the fins of the pit to within the cutting diameter of the pitting knife.

5. In an apparatus for pitting peaches, the combination of halving and pitting means, and means adapted to contact and shift the pit to enable the pitting means to pass around the pit.

6. In a fruit pitting machine, the combination of means for cutting fruit annularly to gain access to the pit, a curved pitting knife for pitting the fruit, said knife having a cutting diameter adapted to cut the depth of the pit but less than the width of the pit, and means adapted to reciprocate the pit in the line of the annular cut to permit the knife to pass around the pit.

7. In a fruit pitter, the combination of impaling means, pitting means having a cutting edge, means for actuating the said pitting means, and means for reciprocating the fruit in advance of the said cutting edge during the actuation of the said pitting means.

8. In a fruit pitting apparatus, the combination of means for halving fruit in the plane of the greatest diameter of the pit of the fruit, a single pitting knife having its axis in the plane of the cut, and means for shifting the pit in the line of the cut.

9. In a fruit pitting apparatus, the combination of means for halving the fruit in the plane of the greatest diameter of the pit of the fruit, a curved pitting knife having its edges of rotation in the line of the cut, and means adapted to enter the cut of the fruit for shifting the pit to permit the said knife to pass around the pit.

10. A fruit pitter comprising means for halving the flesh of the fruit in the plane of the greatest diameter of the pit of the fruit, a rotary pitting knife having a cutting diameter adapted to produce a predetermined depth of cut in the fruit flesh irrespective of the width of the pit, the said rotary pitting knife having its axis in the plane of the cut, means for rotating the said knife, and means in the plane of the cut for shifting the pit during the rotation of the said knife to permit the knife to pass around the pit.

11. In a fruit pitter, means for cleaving the flesh of the fruit, a rotary pitting knife, means for rotating the said rotary pitting knife, and means positioned in the plane of the cut in the flesh of the fruit to engage and shift the pit during the rotation of the said pitting knife.

12. In a fruit pitter, means for halving the flesh of the fruit, a curved pitting knife having a cutting diameter greater than the thickness of the pit but less than the width of the pit, and means adapted to engage the pit for determining the width of the cut formed by the said cutting means in accordance with the width of the pit.

13. In a fruit pitter, means for halving the flesh of the fruit, means for engaging and holding the fruit, a rotary pitting knife, means for rotating the knife, and means adapted to engage the fruit pit to shift the said pit, fruit, and fruit holding means during the rotation of the said pitting knife.

14. In a fruit pitting machine, the combination of impaling means, pitting means having a cutting edge, means for engaging and holding the fruit, means for actuating the said engaging and holding means, means for engaging and shifting the pit of the fruit, and a lost motion connection between the said holding and engaging actuating means and the means for actuating the said engaging means.

15. In a fruit pitting machine, the combination of impaling means having a pit receiving recess, a curved pitting knife mounted within the said recess, means for driving the pitting knife from its opposite ends, and means for actuating opposed portions of the impaling means for shifting the pit of the fruit during the rotation of the said knife.

16. In a fruit pitting device, the combination of an impaling blade having a slot formed therein, the said slot terminating in a pit receiving recess, means mounted in the pit receiving recess for pitting the fruit, means for closing the said slot, and means for shifting the pit from its opposite sides during the rotation of the said knife.

17. A fruit pitting apparatus comprising a slotted impaling blade, one side portion of the said impaling blade being movably supported, a rotary pitting knife, and means for moving the side portion of the said impaling blade in predetermined relation to the rotation of the said pitting knife to shift the fruit pit before rotation of the pitting knife.

18. A fruit pitting apparatus comprising and impaling member having opposed movable portions, pitting means, means for actuating the said pitting means, means for actuating one of said portions to engage the fruit pit to shift the pit clear of the path of the pitting means during the first half of the cycle of actuation of the pitting means, and means for actuating the other of said portions of the impaling blade to shift the pit clear of the pitting means during the second half of the cycle of actuation of the pitting knife.

19. A fruit pitter comprising a bifurcated impaling member, the bifurcation terminating in a pit receiving recess, an operating handle, a fruit holding cup operated by said handle for holding the fruit on the impaling member, a curved pitting knife, means for rotating the curved pitting knife, means operably connecting the pitting knife with said handle, means for shifting the fruit during the rotation of the pitting knife, and means for driving the shifting means from the knife rotating means in timed relation with the rotation of the knife.

20. A fruit pitting machine comprising a base, a bifurcated impaling member having a pit receiving recess, a curved rotary pitting knife mounted in said recess, means for rotating said knife from the opposite ends thereof, means for shifting the fruit pit during the rotation of said pitting means, and means for actuating said shifting from one element of said knife rotating means in timed relation to shift the fruit pit in advance of the said knife.

21. In a fruit pitting machine, the combination of a base, a bifurcated impaling blade supported by said base, an operating shaft journalled in bearings supported by said base, a curved pitting knife mounted in said base, gear segments journalled on said shaft, means for actuating the said gear segments after predetermined rotation of the shaft, pinions meshing with said gear segments for rotating the said curved knife from its opposite ends, a movable impaling blade portion, and cam means carried by one of the segments for actuating the said impaling blade portion.

22. In a fruit pitting machine, the combination of a bifurcated impaling blade having a pit receiving recess, a curved pitting knife mounted in said recess, the said pitting knife having shafts at its opposite ends, bearings supporting said shafts, pinions secured to the shafts, means for rotating the shaft pinions, a movable impaling blade portion, and means connected with said pinion actuating means for actuating said impaling blade portion in timed relation with the rotation of said curved knife.

23. In a fruit pitter, the combination of means for halving the flesh of the fruit, means for severing the fruit pit from the flesh of the fruit, means for yieldably holding the fruit during the pitting operation, and means for shifting the fruit pit during the pitting operation.

24. In a fruit pitter, the combination of means having a slot therein for partially halving the flesh of the fruit, means for yieldably holding the fruit on the halving means, means for cutting the fruit pit from the flesh of the fruit, means for shifting the pit of the fruit during the actuation of the pitting means, and means adapted to be actuated for closing the slot formed in the halving means.

25. In a fruit pitting machine, the combination of means for severing the flesh of the fruit to gain access to the fruit pit, curved rotary pitting means, means for completing the severing of the fruit in the line of the first cut to halve the flesh of the fruit, means for holding the halved fruit on said severing means, means for rotating the curved pitting means, and means for shifting the fruit pit alternately in the line of the cut in advance of the said curved pitting means.

26. In a fruit pitting machine, the combination of means for impaling the flesh of the fruit, curved rotary pitting means having a cutting diameter greater than the thickness of the fruit pit but less than the width thereof, means for rotating the curved pitting means, yieldable means for holding the impaled fruit, means for shifting the fruit pit during the pitting operation, and a single operating handle for operating the holding means, pitting means and shifting means.

27. A fruit pitter comprising an impaling blade, a rotary pitting knife, means for rotating said pitting knife, the impaling blade having a movable portion, an arc segment, means connecting the arc segment with an operating handle, means connecting the handle with the knife rotating means, and timing means between the arc segment and the movable impaling blade portion.

28. A fruit pitter comprising means for halving the flesh of the fruit, a rotary pitting knife having a cutting radius adapted to produce a cut in the fruit flesh the depth of the cut being determined by the width of the pit, means for rotating the knife, and means for intermittently shifting the pit in opposed directions during the rotation of the pitting knife to permit the knife to pass around the pit.

29. In a fruit pitting apparatus, the combination of means for halving the fruit in the plane of the greatest diameter of the pit of the fruit, a rotary pitting knife having its axis in the plane of the cut, and means for shifting the pit from its opposite sides to move the fins of the pit within the cutting diameter of the pitting knife.

30. In a fruit pitter, the combination of impaling means, a rotary pitting knife having a cutting edge, means for yieldably holding the fruit on the impaling means, means for actuating the pitting means, and means for reciprocating the fruit pit in advance of the cutting edge during the actuation of the pitting means.

31. In a fruit pitting device, the combination of impaling means having a slot formed therein, the said slot terminating in a pit receiving recess, pitting means mounted to rotate through said slot and providing a cutting edge, means for engaging and holding the fruit on the impaling means, means for closing the slot, and means for shifting the pit from its opposite sides during the rotation of the pitting knife.

32. A fruit pitter comprising an impaling member upon which the fruit is adapted to be impaled to sever the flesh of the fruit, means for engaging and holding the fruit on the impaling member, the impaling member having opposed movable portions, and means for moving the portions alternately to engage and shift the pit of the fruit.

33. A fruit pitter comprising an impaling member upon which the fruit is impaled to sever the flesh of the fruit, the impaling member having opposed movable members, and means for moving the said members alternately in the plane of the impaling member to engage and shift the pit of the impaled fruit.

34. A fruit pitter comprising an impaling member upon which the fruit is impaled to sever the flesh of the fruit, the impaling member having opposed movable members, a pitting knife, means for actuating the pitting knife, and means to move the movable members of the impaling blade in the plane of the impaling blade in timed relation to the actuation of the pitting knife.

35. A fruit pitting apparatus comprising an impaling member upon which the fruit is impaled to sever the flesh of the fruit, the impaling member having opposed movable portions, a rotary pitting knife, means for rotating the pitting knife, and means to move the movable portions alternately in predetermined relation to the rotation of the pitting knife.

Signed at Los Angeles, California, this 13th day of October, 1926.

ALBERT R. THOMPSON.